(12) United States Patent
Gomes

(10) Patent No.: US 11,827,172 B1
(45) Date of Patent: Nov. 28, 2023

(54) UNDER THIGH SIDE IMPACT AIRBAG (UT-SIAB) FOR A VEHICLE

(71) Applicant: GM Global Technology Operations LLC, Detroit, MI (US)

(72) Inventor: Marcelo Ferreira Gomes, Macomb, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/942,248

(22) Filed: Sep. 12, 2022

(51) Int. Cl.
*B60R 21/231* (2011.01)
*B60R 21/207* (2006.01)
*B60R 21/013* (2006.01)
*B60R 21/233* (2006.01)

(52) U.S. Cl.
CPC ...... *B60R 21/23138* (2013.01); *B60R 21/013* (2013.01); *B60R 21/207* (2013.01); *B60R 21/233* (2013.01); *B60R 2021/23146* (2013.01)

(58) Field of Classification Search
None
See application file for complete search history.

(56) References Cited

U.S. PATENT DOCUMENTS

| | | | | |
|---|---|---|---|---|
| 10,023,146 B2* | 7/2018 | Faruque | ................. | B60N 2/143 |
| 10,471,919 B2* | 11/2019 | Faruque | .............. | B60R 21/2338 |
| 10,632,952 B2* | 4/2020 | Markusic | .............. | B60R 21/231 |
| 10,717,377 B2* | 7/2020 | Dry | ......................... | B60N 2/34 |
| 11,066,033 B2* | 7/2021 | Goswami | .............. | B60R 21/232 |
| 11,407,335 B2* | 8/2022 | Tanabe | .............. | B60R 21/23138 |
| 11,541,836 B1* | 1/2023 | Farooq | ................. | B60R 21/207 |
| 2016/0082915 A1* | 3/2016 | Madaras | ............... | B60R 21/013 |
| | | | | 297/216.19 |
| 2022/0097645 A1* | 3/2022 | Akiyama | .......... | B60R 21/23138 |
| 2023/0008770 A1* | 1/2023 | Geisler | ................ | B60R 21/231 |

FOREIGN PATENT DOCUMENTS

| | | | | |
|---|---|---|---|---|
| CN | 107128274 A | * | 9/2017 | |
| CN | 113511124 B | * | 9/2022 | |
| DE | 102005062849 A1 | * | 9/2007 | ........... B60N 2/4235 |
| DE | 102019116586 A1 | * | 12/2020 | ........... B60R 21/207 |

\* cited by examiner

*Primary Examiner* — Faye M Fleming
(74) *Attorney, Agent, or Firm* — CANTOR COLBURN LLP

(57) ABSTRACT

A vehicle seat mountable in a vehicle, in accordance with a non-limiting example includes a seat back and a seat base connected to the seat back. The seat base includes a first side bolster and a second side bolster, and a selectively deployable air bag mounted in one of the first side bolster and the second side bolster.

18 Claims, 4 Drawing Sheets

UNDER THIGH SIDE IMPACT AIRBAG (UT-SIAB) FOR A VEHICLE

INTRODUCTION

The subject disclosure relates to the art of vehicles and, more particularly, to an under thigh side impact airbag (UT-SIAB) for a vehicle.

Motor vehicles include a number of safety systems designed to protect a driver and/or passenger during an impact. Seat belts and supplemental restraint systems (SRS) in the form of inflatable air bags mounted in a steering wheel limit forward excursions. Side impact air bags (SIAB) may inflate to protect an occupant from side forces. Side impact air bags often take the form of curtains that extend out from either an A-pillar or a B-pillar of a vehicle exposed to side impact forces.

The side impact air bag protects an occupant from structural excursions into the vehicle and from contact with vehicle surfaces. However, the occupant may still shift out of the seat toward a center of the vehicle when exposed to a far side impact force. Shifting out of the seat towards the center of the vehicle may place undesirable stresses on the occupant. Accordingly, it is desirable to provide a system for limiting occupant excursions from a vehicle seat due to far side impact forces.

SUMMARY

A vehicle seat mountable in a vehicle, in accordance with a non-limiting example includes a seat back and a seat base connected to the seat back. The seat base includes a first side bolster and a second side bolster, and a selectively deployable air bag mounted in one of the first side bolster and the second side bolster.

In addition to one or more of the features described herein a crash sensor positioned to detect a side impact on the vehicle, and an air bag activation system operable to deploy the selectively deployable air bag upon detecting the side impact on the vehicle.

In addition to one or more of the features described herein the air bag activation system deploys the selectively deployable air bag upon detecting a side impact force that exceeds a selected force threshold.

In addition to one or more of the features described herein the first side bolster is an interior facing bolster and the second side bolster is an exterior facing bolster, the selectively deployable air bag being mounted in the interior facing bolster.

In addition to one or more of the features described herein the seat base includes a sifting surface disposed between the first side bolster and the second side bolster.

In addition to one or more of the features described herein the first side bolster and the second side bolster project upwardly relative to the sifting surface.

In addition to one or more of the features described herein the vehicle seat defines a driver's seat.

In addition to one or more of the features described herein a seat belt connector is connected to the seat base adjacent to the one of the first side bolster and the second side bolster, the selectively deployable air bag being positioned inwardly of the seat belt connector.

A vehicle, in accordance with a non-limiting example, includes a body defining a passenger compartment and a vehicle seat arranged in the passenger compartment. The vehicle seat includes a seat back and a seat base connected to the seat back. The seat base includes a first side bolster and a second side bolster. A selectively deployable air bag is mounted in one of the first side bolster and the second side bolster.

In addition to one or more of the features described herein a crash sensor is positioned to detect a side impact on the vehicle and an air bag activation system operable to deploy the selectively deployable air bag upon detecting the side impact on the vehicle.

In addition to one or more of the features described herein the air bag activation system deploys the selectively deployable air bag upon detecting a side impact force that exceeds a selected force threshold.

In addition to one or more of the features described herein the first side bolster is an interior facing bolster and the second side bolster is an exterior facing bolster, the selectively deployable air bag being mounted in the interior facing bolster.

In addition to one or more of the features described herein the seat base includes a sitting surface disposed between the first side bolster and the second side bolster.

In addition to one or more of the features described herein the first side bolster and the second side bolster project upwardly relative to the sitting surface.

In addition to one or more of the features described herein the vehicle seat defines a driver's seat.

In addition to one or more of the features described herein a seat belt connector is connected to the seat base adjacent to the one of the first side bolster and the second side bolster, the selectively deployable air bag being positioned inwardly of the seat belt connector.

A method of protecting an occupant in a vehicle, in accordance with a non-limiting example, includes sensing an impact on a side of the vehicle with a side impact sensing system and inflating an air bag arranged in a bolster of a vehicle seat adjacent a thigh and pelvis of the occupant of the vehicle.

In addition to one or more of the features described herein inflating the air bag includes activating the air bag upon detecting the impact above a selected force threshold.

In addition to one or more of the features described herein inflating the air bag includes activating the air bag in the bolster arranged on a side of the vehicle seat opposite the side of the vehicle experiencing the impact.

In addition to one or more of the features described herein activating the air bag includes constraining lateral movement of the occupant of the vehicle away from the side of the vehicle experiencing the impact.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
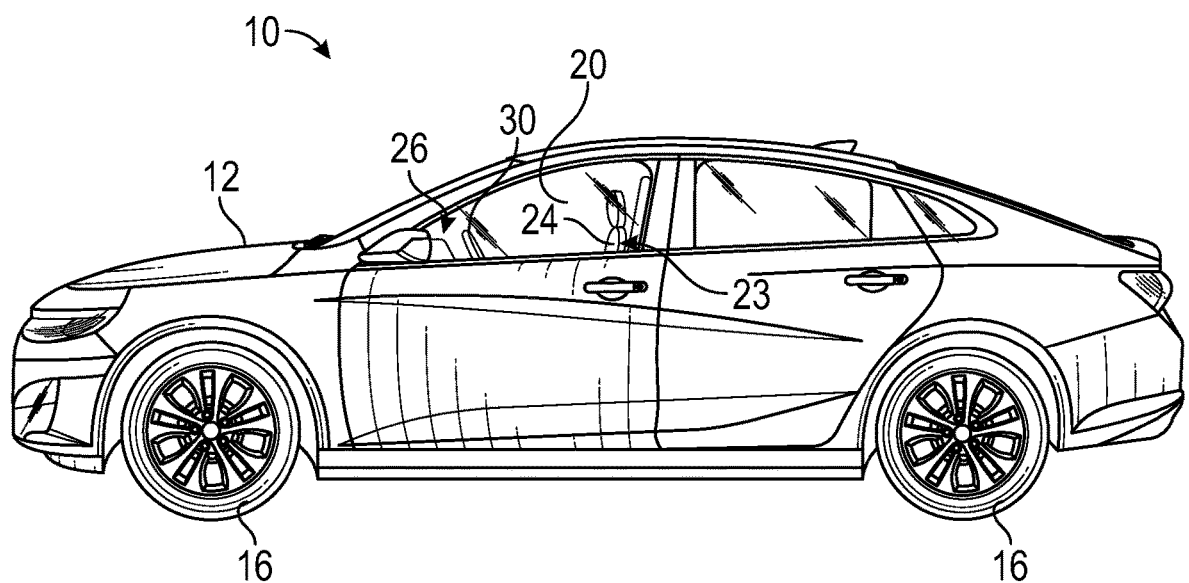
FIG. 1 is a side view of a vehicle including an under thigh side impact air bag, in accordance with a non-limiting example.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

A vehicle, in accordance with a non-limiting example, is indicated generally at 10 in FIG. 1. Vehicle 10 includes a body 12 supported on a plurality of wheels, two of which are indicated at 16. Two of the plurality of wheels 16 are steerable. That is, changing a position of two of the plurality of wheels 16 relative to body 12 will cause vehicle 10 to change direction. In the non-limiting example shown, both front wheels (not separately labeled) of the plurality of wheels 16 are steerable. Body 12 defines, in part, a passenger compartment 20 having seats 23 including a driver's seat 24 positioned behind a dashboard 26. A steering control system 30 is arranged between seats 23 and dashboard 26. Steering control system 30 is operated to control the orientation of the steerable wheel(s). A console 32 (FIG. 2) is arranged inwardly of driver's seat 24.

Figure 2:
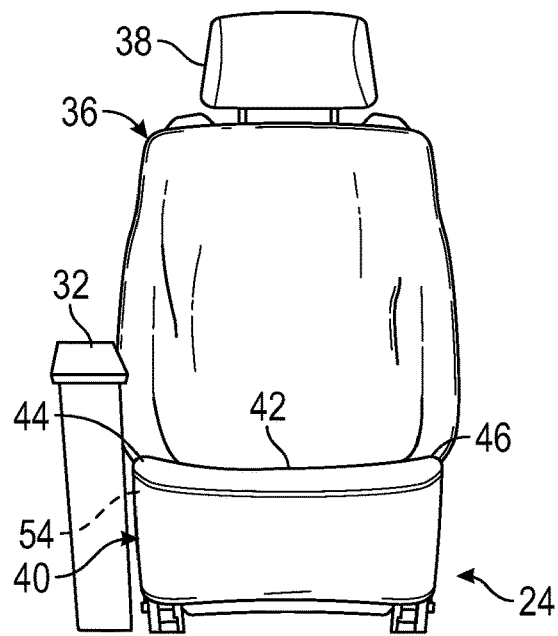
FIG. 2 is a front view of a vehicle seat having an under thigh side impact air bag, in accordance with a non-limiting example.
Figure 3:
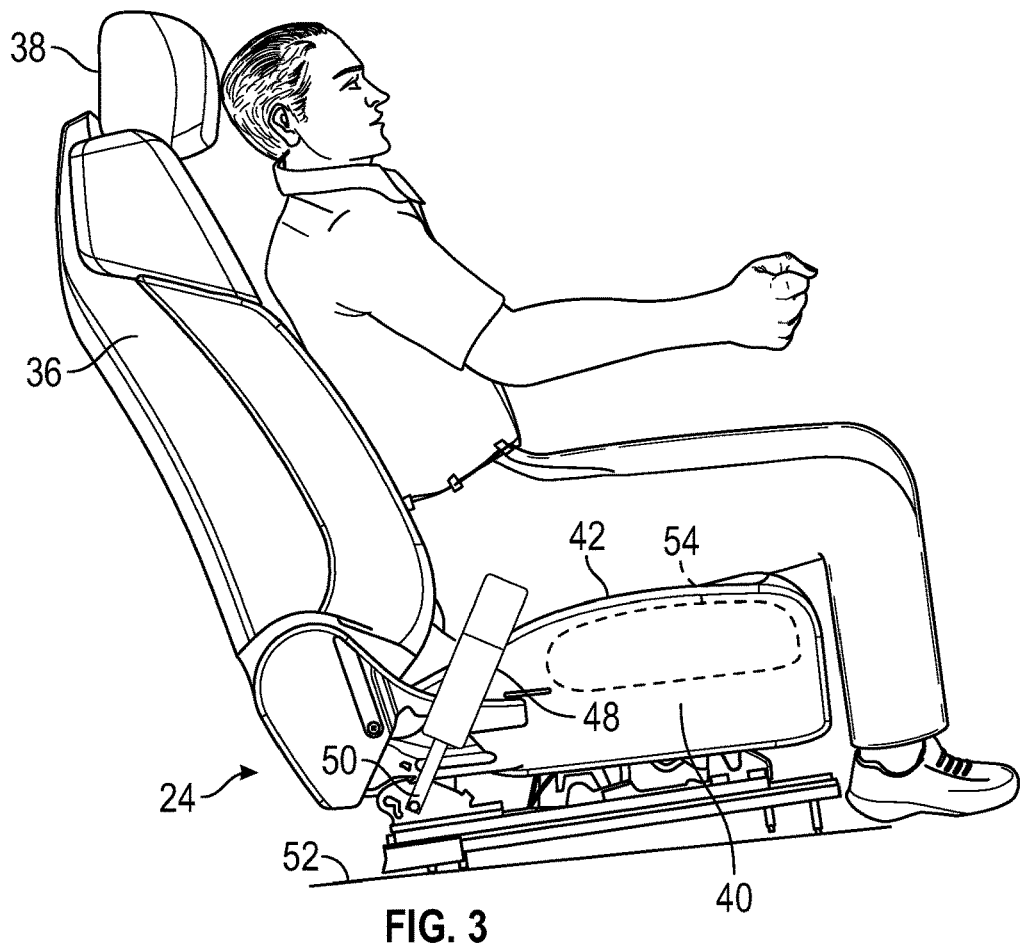
FIG. 3 is a right side view of the vehicle seat of FIG. 2, in accordance with a non-limiting example.

Referring to FIGS. 2 and 3, driver's seat 24 includes a seat back 36 supporting a head rest 38. Driver's seat 24 further includes a seat base 40. Seat back 36 may be pivotally connected to seat base 40. Seat base 40 includes a central seating surface 42 flanked by a first side bolster 44 and a second side bolster 46. First side bolster 44 is on an interior facing side (not separately labeled) of driver's seat 24 and second side bolster 46 is on an exterior or door facing side (also not separately labeled) of driver's seat 24. A seat belt connector 48 is arranged adjacent first side bolster 44 and includes an anchor 50 secured to a floor 52 of vehicle 10 in passenger compartment 20.

Figure 4:
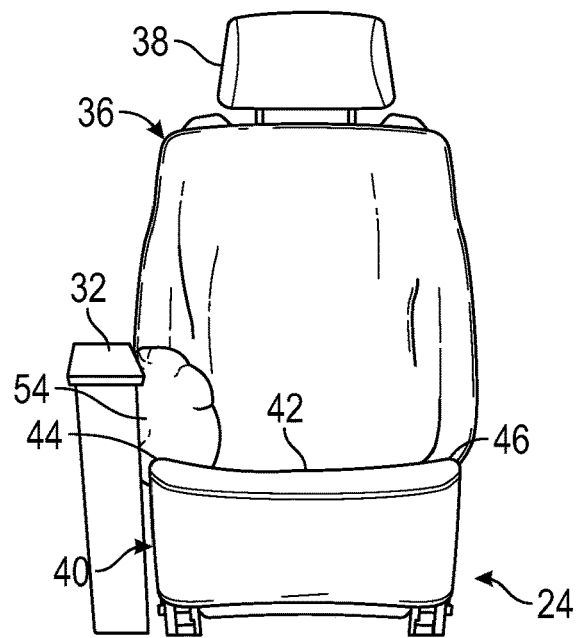
FIG. 4 is a front view of a vehicle seat of FIG. 2 depicting the under thigh side impact air bag in a deployed configuration, in accordance with a non-limiting example.
Figure 5:
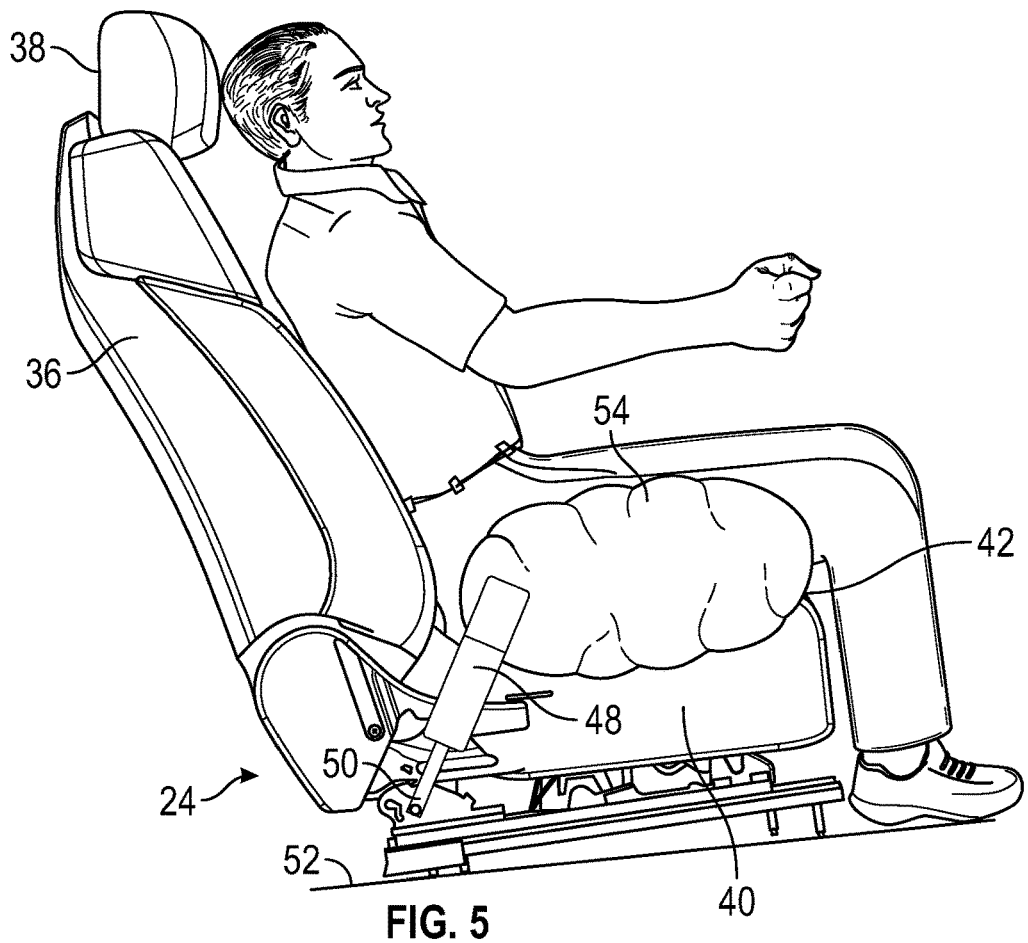
FIG. 5 is a right side view of the vehicle seat of FIG. 4, in accordance with a non-limiting example.

In accordance with a non-limiting example, an under thigh side impact air bag (UT-SIAB) 54 is arranged in first side bolster 44 adjacent a thigh and pelvis of a seated occupant. UT-SIAB 54 is in a normally un-inflated configuration, such as shown in FIGS. 2 and 3. However, when a crash force is experienced on, for example, a passenger side (not separately labeled) of vehicle 10, UT-SIAB 54 inflates, such as shown in FIGS. 4 and 5, to limit occupant excursions from seat 24 and reduce potential undesirable stresses on the occupant caused by an interaction between the occupant, a seat belt and/or floor console. That is, when inflated, UT-SIAB 54 forms a barrier that limits an occupant's movement toward a center of vehicle 10 and reduces and or prevents impacts between an occupants thigh and/or pelvis with console 32. By reducing side movement and creating a soft barrier, the likelihood of occupant injury is reduced. At this point, it should be understood that while shown in connection with driver's seat 24, UT-SIAB may be integrated into any seat in passenger compartment 20.

Figure 6:
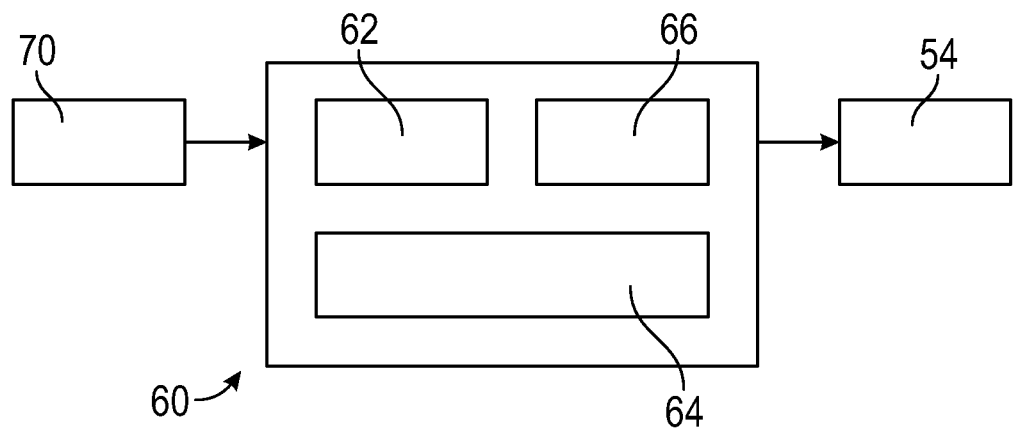
FIG. 6 is a block diagram depicting a side impact airbag activation system, in accordance with a non-limiting example.

In a non-limiting example, vehicle 10 includes a UT-SIAB activation system 60 such as shown in FIG. 6. UT-SIAB activation system 60 includes a central processor unit (CPU) 62 operatively connected to a non-volatile memory 64 and a UT-SIAB activation module 66. A sensor 70 is connected to UT-SIAB activation system 60. Sensor 70 detects side impact forces on vehicle 10. UT-SIAB activation system 60 is also connected to UT-SIAB 54. CPU 62 signals UT-SIAB activation module 66 when side impact forces detected by sensor 70 exceed a predetermined threshold stored in non-volatile memory 64 and are experienced on a driver's side of vehicle 10. At this point, it should be understood that while shown as being mounted in an inside bolster of a driver's seat, the UT-SIAB, in accordance with a non-limiting example, may be arranged in other seats and the air bag activation system updated accordingly.

The terms "a" and "an" do not denote a limitation of quantity, but rather denote the presence of at least one of the referenced items. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical, and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A vehicle seat mountable in a vehicle, the vehicle seat comprising:
   a seat back;
   a seat base connected to the seat back, the seat base including a first side bolster and a second side bolster;
   a selectively deployable air bag mounted in one of the first side bolster and the second side bolster; and
   a seat belt connector connected to the seat base adjacent to the one of the first side bolster and the second side bolster, the selectively deployable air bag being positioned inwardly of the seat belt connector.

2. The vehicle seat according to claim 1, further comprising:
- a crash sensor positioned to detect a side impact on the vehicle; and
- an air bag activation system operable to deploy the selectively deployable air bag upon detecting the side impact on the vehicle.

3. The vehicle seat according to claim 2, wherein the air bag activation system deploys the selectively deployable air bag upon detecting a side impact force that exceeds a selected force threshold.

4. The vehicle seat according to claim 1, wherein the first side bolster is an interior facing bolster and the second side bolster is an exterior facing bolster, the selectively deployable air bag being mounted in the interior facing bolster.

5. The vehicle seat according to claim 1, wherein the seat base includes a sitting surface disposed between the first side bolster and the second side bolster.

6. The vehicle seat according to claim 5, wherein the first side bolster and the second side bolster project upwardly relative to the sitting surface.

7. The vehicle seat according to claim 1, wherein the vehicle seat defines a driver's seat.

8. A vehicle comprising:
- a body defining a passenger compartment; and
- a vehicle seat arranged in the passenger compartment, the vehicle seat including:
  - a seat back;
  - a seat base connected to the seat back, the seat base including a first side bolster and a second side bolster;
  - a selectively deployable air bag mounted in one of the first side bolster and the second side bolster; and
  - a seat belt connector connected to the seat base adjacent to the one of the first side bolster and the second side bolster, the selectively deployable air bag being positioned inwardly of the seat belt connector.

9. The vehicle according to claim 8, further comprising:
- a crash sensor positioned to detect a side impact on the vehicle; and
- an air bag activation system operable to deploy the selectively deployable air bag upon detecting the side impact on the vehicle.

10. The vehicle according to claim 9, wherein the air bag activation system deploys the selectively deployable air bag upon detecting a side impact force that exceeds a selected force threshold.

11. The vehicle according to claim 8, wherein the first side bolster is an interior facing bolster and the second side bolster is an exterior facing bolster, the selectively deployable air bag being mounted in the interior facing bolster.

12. The vehicle according to claim 8, wherein the seat base includes a sitting surface disposed between the first side bolster and the second side bolster.

13. The vehicle according to claim 12, wherein the first side bolster and the second side bolster project upwardly relative to the sitting surface.

14. The vehicle according to claim 1, wherein the vehicle seat defines a driver's seat.

15. A method of protecting an occupant in a vehicle comprising:
- sensing an impact on a side of the vehicle with a side impact sensing system; and
- inflating an air bag arranged in a bolster positioned inwardly of a seat belt connector connected to a seat base adjacent the bolster of a vehicle seat and adjacent a thigh and pelvis of the occupant of the vehicle.

16. The method of claim 15, wherein inflating the air bag includes activating the air bag upon detecting the impact above a selected force threshold.

17. The method of claim 15, wherein inflating the air bag includes activating the air bag in the bolster arranged on a side of the vehicle seat opposite the side of the vehicle experiencing the impact.

18. The method of claim 15, wherein activating the air bag includes constraining lateral movement of the occupant of the vehicle away from the side of the vehicle experiencing the impact.

* * * * *